(12) United States Patent
Shepherd et al.

(10) Patent No.: US 9,652,963 B2
(45) Date of Patent: May 16, 2017

(54) PROVISIONING AND MANAGING AUTONOMOUS SENSORS

(71) Applicant: Dell Products, LP, Round Rock, TX (US)

(72) Inventors: Jason A. Shepherd, Austin, TX (US); Liam B. Quinn, Austin, TN (US); Neal R. Kohl, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 110 days.

(21) Appl. No.: 14/812,488

(22) Filed: Jul. 29, 2015

(65) Prior Publication Data
US 2017/0032645 A1   Feb. 2, 2017

(51) Int. Cl.
| G08B 1/08 | (2006.01) |
|---|---|
| B60R 25/10 | (2013.01) |
| G08C 19/16 | (2006.01) |
| G08B 3/00 | (2006.01) |
| G08B 29/00 | (2006.01) |
| G08B 23/00 | (2006.01) |
| G08B 13/00 | (2006.01) |
| G08B 21/02 | (2006.01) |

(52) U.S. Cl.
CPC ....... *G08B 21/0213* (2013.01); *G08B 21/023* (2013.01); *G08B 21/0277* (2013.01)

(58) Field of Classification Search
None
See application file for complete search history.

(56) References Cited

U.S. PATENT DOCUMENTS

| 8,041,772 | B2 | 10/2011 | Amanuddin et al. | |
|---|---|---|---|---|
| 9,014,765 | B2* | 4/2015 | Qi | H04W 52/0229 340/572.1 |
| 2002/0145538 | A1 | 10/2002 | Bocko et al. | |
| 2007/0112700 | A1* | 5/2007 | Den Haan | G05D 1/024 706/14 |
| 2007/0150565 | A1* | 6/2007 | Ayyagari | H04L 67/12 709/223 |
| 2007/0258508 | A1* | 11/2007 | Werb | H04W 84/18 375/140 |
| 2009/0063879 | A1* | 3/2009 | Kawamoto | H04W 52/0225 713/310 |
| 2011/0299426 | A1* | 12/2011 | Kumar | H04W 52/0235 370/256 |

(Continued)

FOREIGN PATENT DOCUMENTS

WO   WO 2007/028690 A1   3/2007

*Primary Examiner* — Steven Lim
*Assistant Examiner* — Muhammad Adnan
(74) *Attorney, Agent, or Firm* — Larson Newman, LLP

(57) ABSTRACT

A autonomous sensor includes a sensor configured to measure one or more events, a network interface, and a processor. The autonomous sensor is configured to communicate with a plurality of other autonomous sensors using the network interface. The processor is configured to detect, while in a discovery state, if an event has occurred and enter an active state if the event occurred, when an event has occurred, enter an active state, transmit event data to a parent while in the active state, detect the presence of a neighboring sensor; and when the neighboring sensor is detected, while in a nomadic state, monitor the activity of the neighboring sensor.

16 Claims, 3 Drawing Sheets

(56) References Cited

U.S. PATENT DOCUMENTS

2012/0127902 A1* 5/2012 Muqattash ........ H04W 52/0229
                                                    370/311
2013/0130734 A1* 5/2013 Rice .................... G01M 5/0066
                                                    455/517

* cited by examiner

PROVISIONING AND MANAGING AUTONOMOUS SENSORS

FIELD OF THE DISCLOSURE

The present disclosure generally relates to information handling systems, and more particularly relates to provisioning and managing autonomous sensors.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
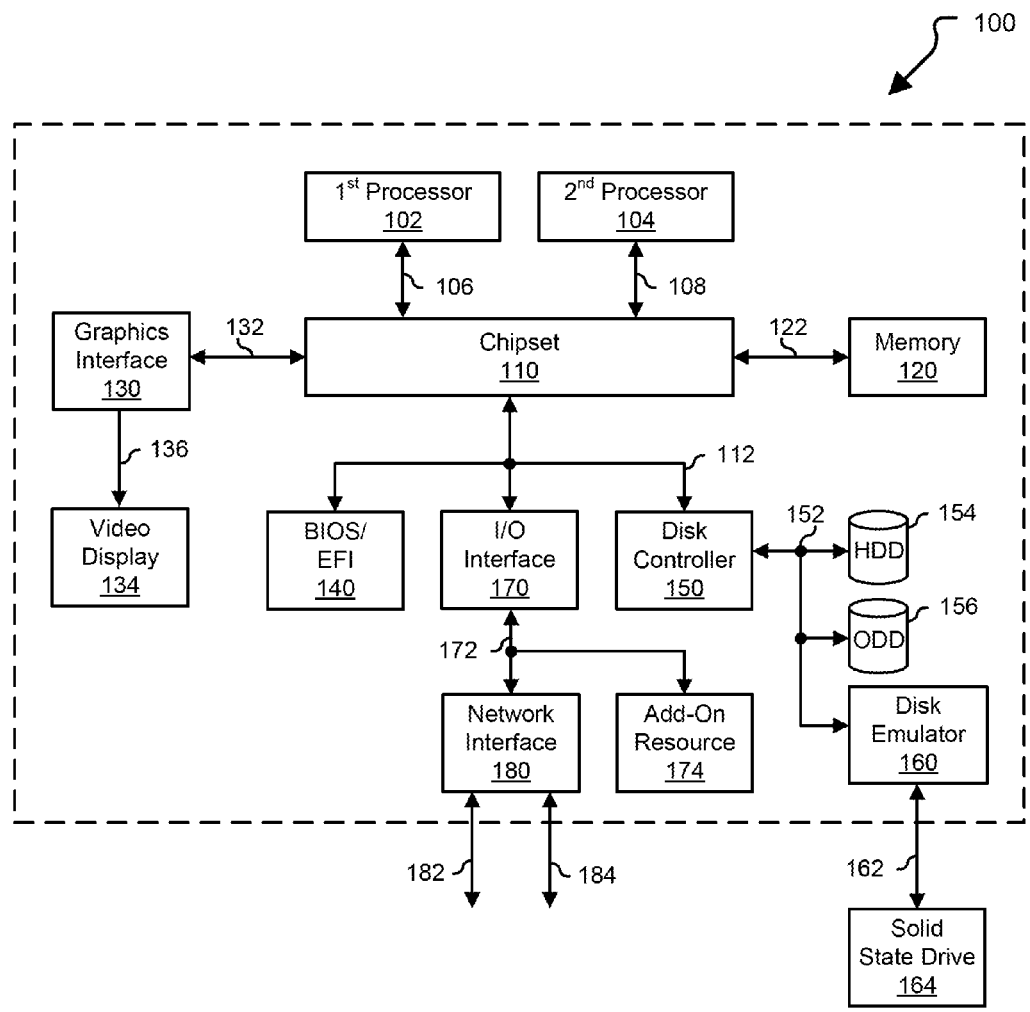
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
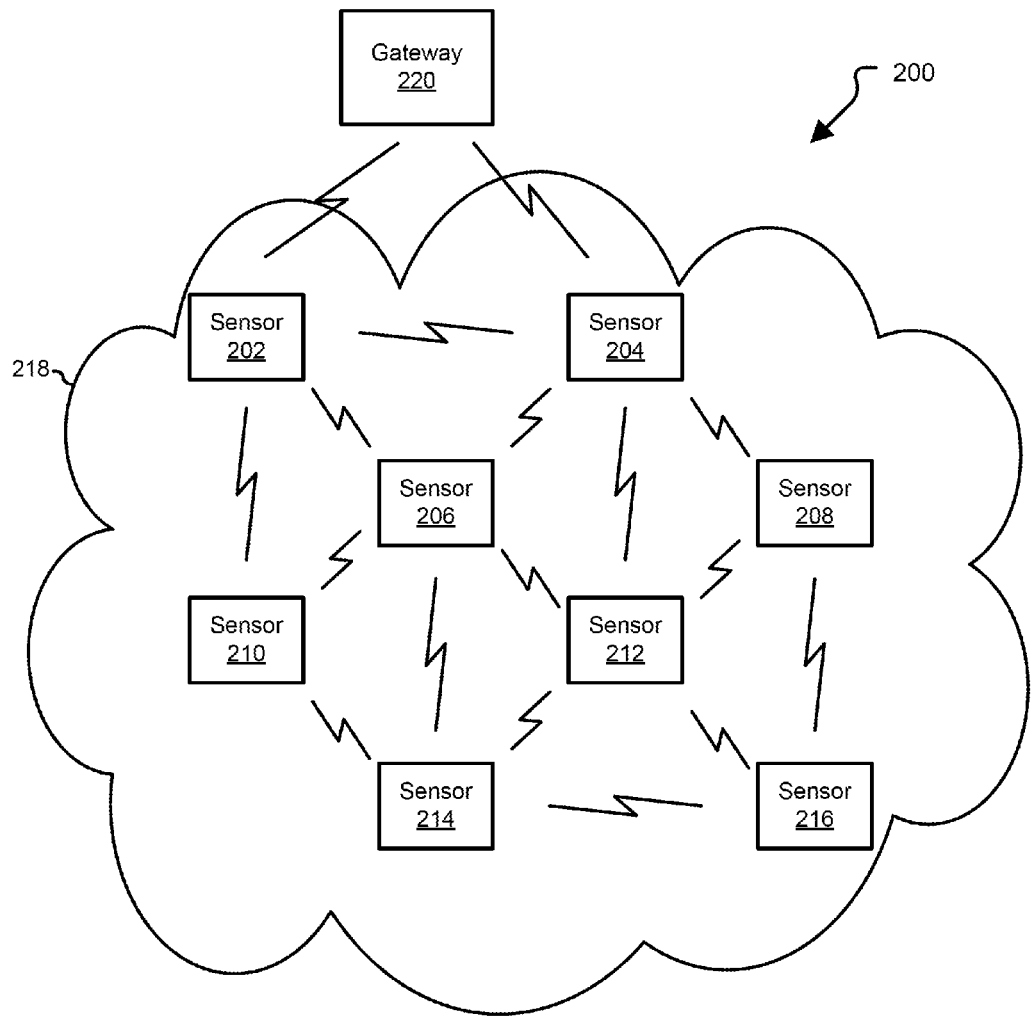
FIG. 2 is a block diagram illustrating a mesh network of sensors, in accordance with various embodiments.

FIG. 2 is a block diagram 200 illustrating an exemplary network of sensors. A plurality of sensors 202, 204, 206, 208, 210, 212, 214, and 216 can be placed in an environment. The sensors 202, 204, 206, 208, 210, 212, 214, and 216 can include environmental monitoring sensors, energy management sensors, infrastructure management sensors, building automation sensors, transportation monitoring sensors, and the like. Environmental monitoring sensors can be used to monitor air/water quality (such as concentrations of pollutants or particulates), atmospheric conditions (such as temperature, humidity, wind speed, or rain fall), soil conditions (such as temperature, moisture content, or movement), and the like. Energy management sensors can be used to monitor energy consumption of systems and appliances and can be used to control systems and appliances to manage energy consumption, such as by shifting usage from peak to off-peak times. Building automation sensors can be used to monitor and control lighting, heating, ventilation, air conditioning, appliances, communication systems, entertainment and home security devices to improve convenience, comfort, energy efficiency, and security. Infrastructure management sensors can be used to monitor events or changes in conditions that can compromise safety and increase risk and to provide information that can be used for scheduling repair and maintenance activities in an efficient manner, such as by coordinating tasks between different service providers and users of the infrastructure. Transportation monitoring sensors can provide information about traffic flow, parking capacity, transportation utilization, and the like which can be used to redirect traffic around congestion, reallocate public transportation to high demand routes, and direct drivers to available parking, as well as provide information for usage based billing.

Sensors 202 through 216 can form a mesh network 218 by communicating with sensors in close proximity. For example, sensor 206 can communicate directly with sensors 202, 204, 210, and 212 and 214, and can communicate with sensor 208 through sensor 204 or 212 or 214 and 216. The mesh network 218 can provide a fault tolerant communication network to automatically adapt when a sensor goes off line. For example, sensor 212 may normally communicate with sensor 202 via sensor 206. If sensor 206 is not responding, sensor 212 could communicate with sensor 202 via sensor 204 until the connectivity of sensor 206 is restored. Gateway 220 can communicate with the sensors 202 through 216, such as by way of sensors 202 and 204. Gateway 220 can provide an access point to a larger network to enable remote management of the sensors 202 through 216 and remote access to the information provided by the sensors. Additionally, gateway 220 can aggregate the information from sensors 202 through 216 and provide the information to a cloud based platform or directly to remote devices.

In various embodiments, the mesh network 218 may operate on one or more networking protocols such as Bluetooth, Wi-Fi, Z-Wave, ZigBee, X-10 or the like. In various embodiments the mesh network 218 may operate on one or more networking protocol such as Bluetooth, Wi-Fi, Z-Wave, ZigBee, X-10, or the like. Mesh networks 218 may also operate using one or more communication media such as radio frequency communication, dedicated hardwired networks, or embedded signals into existing power circuits.

Figure 3:
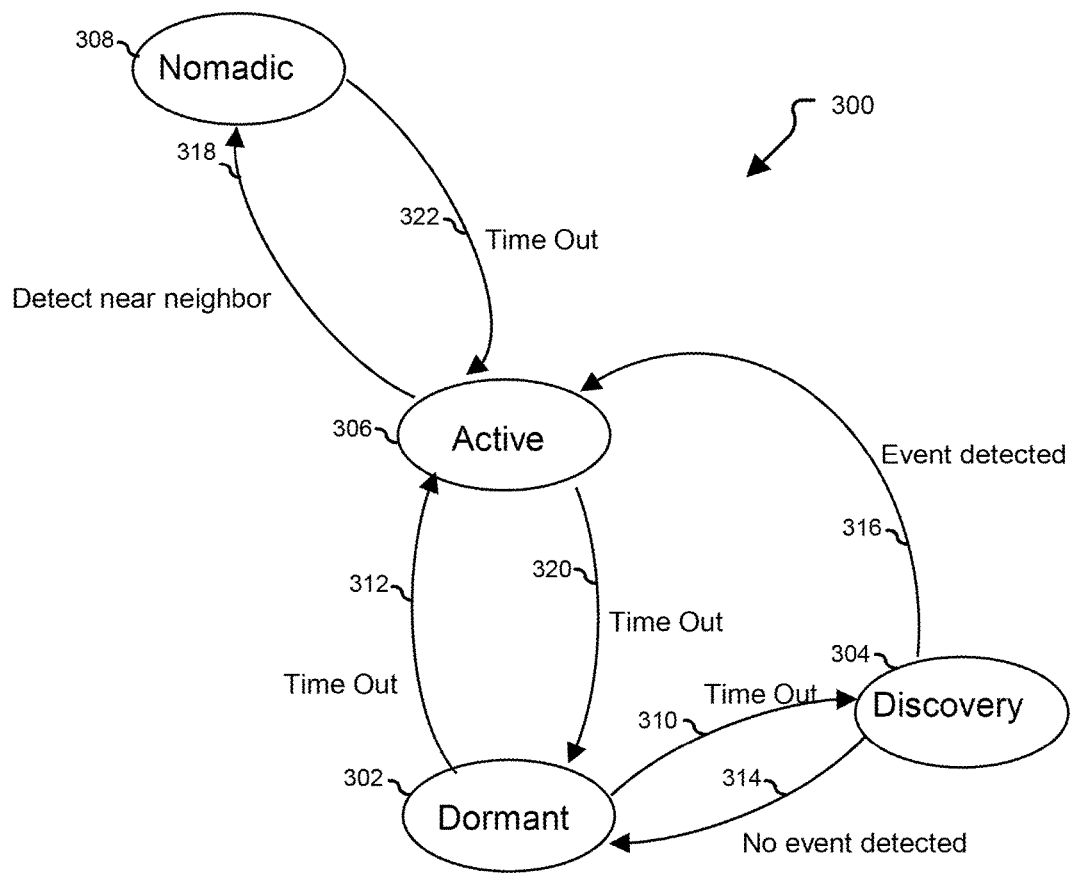
FIG. 3 is a state diagram illustrating the operation of an exemplary sensor within a network of autonomous sensors.

FIG. 3 is a state diagram 300 illustrating the operation of an autonomous sensor, such as sensor 202 of FIG. 2. The autonomous sensor can operate in one of four states, a dormant state 302, a discovery state 304, an active state 306, and a nomadic state 308.

In the dormant state 302, the autonomous sensor can go into a sleep mode. For example, the autonomous sensor can generally suspend network activity and throttle down processor activity. In various embodiments, the autonomous sensor can continue to monitor the local environment such as by continuing to take temperature readings, humidity readings, and the like. In other embodiments, the autonomous sensor may not readout the measurements of the local environment, but rather only sample the data when not in the dormant state. From the dormant state 302, when a predetermined time period has passed, the autonomous sensor may enter the discovery state 304 by arrow 310 or the active state 306 by arrow 312.

In the discovery state 304, the autonomous sensor can check the status and determine if an event has occurred. For example, the autonomous sensor can sample the measurement data and determine if a change needs to be reported. For example, a parking sensor may check to see if a vehicle is present in a parking space and determine if there was a change in the status of the parking spot. From the discovery state 304, if an event is not detected or has not occurred, the autonomous sensor may enter the dormant state 304 by arrow 314. Alternatively, if an event has occurred, the autonomous sensor can enter the active state 306 by arrow 316.

In the active state 306, the autonomous sensor can transmit data, such as the measurement data. In various embodiments, the autonomous sensor may transmit data at a periodic rate, such as reporting the temperature at regular intervals. In other embodiments, the autonomous sensor may transmit data when certain conditions are met, such as a change of status in the environment. Further, the autonomous sensor may receive and transmit data from nearby autonomous sensors. Additionally, the autonomous sensor may receive instructions from an administrator or user. The instructions can be for the autonomous sensor or can be passed along through the network to another autonomous sensor. In various embodiments, the autonomous sensor can send out a heartbeat signal when in the active state to notify the network that it is operational and ready to receive instructions or to pass along messages through the network. Additionally, while in the active state 306, the autonomous sensor may identify nearby sensors in the environment and in the network. From the active state 306, the autonomous sensor can enter the nomadic state 308 by arrow 318 if a neighboring sensor is detected, or may return to the dormant state 302 by arrow 320 if a time period has elapsed without detected a new neighboring sensor and all data needing to be sent has been transmitted.

In nomadic state 308, the autonomous sensor can assess adjacent sensors in the environment and the network. The autonomous sensor can observe the frequency and amount of transmitted data from the nearby sensor, can determine the class of data transmitted by the nearby sensor, and, in a wireless environment, may identify a direction and distant of the nearby sensor based on the direction, strength, and latency of an incoming transmission. The autonomous sensor may also determine the size and type of queue used by the nearby sensor, such as by how much data is transmitted and the frequency of event data vs non-event data. In various embodiments, the autonomous sensor may determine a correlation with the nearby sensor. In various embodiments, the autonomous sensor may synchronize the dormant and active state cycles with the nearby sensor, such as to avoid collisions in the network or to improve the network topology. For example, the autonomous sensor may be a parent or child of a nearby sensor and synchronizing the active states of the two sensors may enable more efficient communication between the parent and child, rather than a sensor in an active state transmitting data to a parent sensor that is in a dormant state. From the nomadic state 308, the autonomous sensor can return to the active state 306 by arrow 322 after the autonomous sensor has been in the nomadic state for a period of time or has not identified any further nearby sensors to assess.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An autonomous sensor in communication with a plurality of other autonomous sensors, comprising:
   a sensor configured to measure one or more events;
   a network interface configured to communicate with one of the other autonomous sensors; and
   a processor configured to:
      in a discovery state detect if an event has occurred, and when an event has occurred, enter an active state;
      in the active state transmit event data to a parent, receive and transmit data from nearby autonomous sensors, and detect the presence of a neighboring sensor, and when the neighboring sensor is detected, enter a nomadic state; and
      in the nomadic state, monitor the activity of the neighboring sensor to observe the frequency and amount of transmitted data from the nearby sensor, determine the class of data transmitted by the nearby sensor, or identify a direction and distance of the nearby sensor based on the direction, strength, and latency of an incoming wireless transmission, and return to the active state after a period of time.

2. The autonomous sensor of claim 1, wherein the processor is further configured to go into a dormant state when no event is detected in the discovery state or after a period of time has passed in the active state.

3. The autonomous sensor of claim 2, wherein the sensor will enter the active state or the discovery state after a defined period of time has passed in the dormant state.

4. The autonomous sensor of claim 1, wherein the wherein the autonomous sensor include an environmental monitoring sensor, an energy management sensor, an infrastructure management sensor, a building automation sensor, a transportation monitoring sensor, or any combination thereof.

5. The autonomous sensor of claim 1, wherein monitoring the activity of the neighboring sensor includes determining a duration of transmissions or a frequency of transmissions from the neighboring sensor.

6. The autonomous sensor of claim 1, wherein monitoring the activity of the neighboring sensor includes determining a spatial correlation of the neighboring sensor based on the path and angle of a signal from the neighboring sensor.

7. The autonomous sensor of claim 1, wherein monitoring the activity of the neighboring sensor includes determining a queue length, a queue type, or a data type from the neighboring sensor.

8. A method performed by an autonomous sensor, comprising:
   detecting, using a sensor, if an event has occurred;
   transmitting event data to a parent using a network interface;
   receiving and transmitting data from nearby autonomous sensors;
   detecting the presence of a neighboring autonomous sensor;
   when the neighboring autonomous sensor is present, monitoring the network activity of the neighboring autonomous sensor to observe the frequency and amount of transmitted data from the nearby sensor, determine the class of data transmitted by the nearby sensor, or identify a direction and distance of the nearby sensor based on the direction, strength, and latency of an incoming wireless transmission; and
   determining a spatial or temporal correlation with the neighboring autonomous sensor based on the network activity.

9. The method of claim 8, further comprising entering a dormant state for a predefined period of time when no event has occurred.

10. The method of claim 8, wherein monitoring the activity of the neighboring sensor includes determining a duration of transmissions or a frequency of transmissions from the neighboring sensor.

11. The method of claim 8, wherein monitoring the activity of the neighboring sensor includes determining a spatial correlation of the neighboring sensor based on the path and angle of a signal from the neighboring sensor.

12. The method of claim 8, wherein monitoring the activity of the neighboring sensor includes determining a queue length, a queue type, or a data type from the neighboring sensor.

13. A sensor network comprising:
   a plurality of autonomous sensors including:
   a sensor configured to measure one or more events;
   a network interface configured to communicate with one or more of the autonomous sensors; and
   a processor configured to:
      in a discovery state detect if an event has occurred, and when an event has occurred, enter an active state;
      in the active state transmit event data to a parent, receive and transmit data from nearby autonomous sensors, and detect the presence of a neighboring sensor, and when the neighboring sensor is detected, enter a nomadic state; and
      in the nomadic state monitor the activity of the neighboring sensor to observe the frequency and amount of transmitted data from the nearby sensor, determine the class of data transmitted by the nearby sensor, or identify a direction and distance of the nearby sensor based on the direction, strength, and latency of an incoming wireless transmission, and return to the active state after a period of time.

14. The sensor network of claim 13, wherein monitoring the activity of the neighboring sensor includes determining a duration of transmissions or a frequency of transmissions from the neighboring sensor.

15. The sensor network of claim 13, wherein monitoring the activity of the neighboring sensor includes determining a spatial correlation of the neighboring sensor based on the path and angle of a signal from the neighboring sensor.

16. The sensor network of claim 13, wherein monitoring the activity of the neighboring sensor includes determining a queue length, a queue type, or a data type from the neighboring sensor.

* * * * *